United States Patent
Tang

(10) Patent No.: US 10,945,263 B2
(45) Date of Patent: Mar. 9, 2021

(54) COMMUNICATION METHOD AND COMMUNICATION APPARATUS

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 31 days.

(21) Appl. No.: 16/320,506

(22) PCT Filed: Jul. 27, 2016

(86) PCT No.: PCT/CN2016/091965
§ 371 (c)(1),
(2) Date: Jul. 24, 2019

(87) PCT Pub. No.: WO2018/018479
PCT Pub. Date: Feb. 1, 2008

(65) Prior Publication Data
US 2020/0045695 A1  Feb. 6, 2020

(51) Int. Cl.
*H04W 72/04* (2009.01)
*H04L 5/00* (2006.01)
*H04W 52/52* (2009.01)

(52) U.S. Cl.
CPC ....... *H04W 72/0446* (2013.01); *H04L 5/0007* (2013.01); *H04W 52/52* (2013.01); *H04W 72/0466* (2013.01)

(58) Field of Classification Search
CPC .............. H04W 72/04; H04W 72/044; H04W 72/0446; H04W 72/0466; H04W 52/52; H04L 5/0007
See application file for complete search history.

(56) References Cited

U.S. PATENT DOCUMENTS

| | | |
|---|---|---|
| 2003/0193970 A1 | 10/2003 | Kim et al. |
| 2015/0146647 A1 | 5/2015 | Chatterjee et al. |
| 2015/0256308 A1 | 9/2015 | Ma et al. |
| 2016/0352551 A1* | 12/2016 | Zhang ................ H04L 27/2602 |

(Continued)

FOREIGN PATENT DOCUMENTS

| | | |
|---|---|---|
| CN | 102316070 | 1/2012 |
| CN | 102957636 | 3/2013 |

(Continued)

OTHER PUBLICATIONS

WIPO, ISR for PCT/CN2016/091965, dated Apr. 20, 2017.

(Continued)

*Primary Examiner* — Paul H Masur
(74) *Attorney, Agent, or Firm* — Hodgson Russ LLP

(57) ABSTRACT

A communication method includes: generating a first radio frame by a communication apparatus, a time domain length of first symbol in the first radio frame exceeding any time domain length of any one of remaining symbols in the first radio frame; and transmitting the first radio frame by the communication apparatus. According to the communication method, communication can be achieved between communication apparatuses in a wireless communication system.

27 Claims, 6 Drawing Sheets

(56) References Cited

U.S. PATENT DOCUMENTS

| | | | |
|---|---|---|---|
| 2017/0238272 A1 | 8/2017 | You et al. | |
| 2018/0152276 A1* | 5/2018 | Hu | H04L 27/26 |
| 2018/0316532 A1* | 11/2018 | Tie | H04L 27/2602 |
| 2018/0343153 A1* | 11/2018 | Zhang | H04L 5/0007 |
| 2019/0223177 A1* | 7/2019 | Yamada | H04L 5/005 |

FOREIGN PATENT DOCUMENTS

| | | |
|---|---|---|
| CN | 102957636 | 5/2015 |
| CN | 105024791 | 11/2015 |
| CN | 105025574 | 11/2015 |
| EP | 3484201 | 5/2019 |
| JP | 2013535163 | 9/2013 |
| WO | 2015080853 | 6/2015 |
| WO | 2015100136 | 7/2015 |
| WO | 2015131827 | 9/2015 |
| WO | 2015158056 | 10/2015 |
| WO | 2016021979 | 2/2016 |
| WO | 2016094191 | 6/2016 |

OTHER PUBLICATIONS

Nokia Networks, "NB-PUSCH design for NB-IOT," 3GPP TSG RAN1 NB-IOT adhoc, R1-160008, Jan. 2016, 9 pages.
EPO, Office Action for EP Application No. 16910060.9, dated Feb. 14, 2020.
SIPO, First Office Action for CN Application No. 201680087960.3, dated Mar. 16, 2020.
"Reply LS on AGC and Frequency Error for D2D," 3GPP TSG-RAN WG4 Meeting #70, R4-141241, response to R1-134930, Feb. 2014, 1 page.
EPO, Office Action for EP Application No. 16910060.9, dated Jun. 17, 2020.
SIPO, Second Office Action for CN Application No. 201680087960.3, dated Jul. 13, 2020.
IPI, Office Action for in Application No. 201917007742, dated Sep. 23, 2020.
JPO, Office Action for JP Application No. 2019-504014, dated Oct. 6, 2020.

\* cited by examiner

```
Communication apparatus generates a radio frame, all symbols in the
radio frame have a same time domain length; and sequences carried     ~ S410
by preceding M symbols in the radio frame are known to the
communication apparatus
                              ↓
Communication apparatus transmits the radio frame                     ~ S420
```

COMMUNICATION METHOD AND COMMUNICATION APPARATUS

CROSS-REFERENCE TO RELATED APPLICATION

This application is a U.S. national phase application of International Application No. PCT/CN2016/091965, filed Jul. 27, 2016, the entire disclosure of which is incorporated herein by reference.

TECHNICAL FIELD

The present disclosure relates to the field of wireless communication technologies, and more particularly, to a communication method and a communication apparatus.

BACKGROUND

The basic parameter set in a wireless communication system can be understood as the most basic set of parameters in a wireless communication system. For the Long Term Evolution (LTE) system, the current basic parameter set includes that the subcarrier width is 15 kilohertz (kHz), and time domain length of the symbol is 1/(15 kHz) which is about 66.67 microseconds (us).

With the development of wireless communication systems, wireless communication systems can support other numerologies, such as numerology that can support other sub-carrier widths and time domain lengths of symbols. For example, if a subcarrier width is $15*2^k$ kHz and time domain length of a symbol is $1/(15\ \text{kHz})/2^k$, wherein k is a positive integer.

A wireless communication system requires a communication method and a communication apparatus corresponding to a numerology supported by such a wireless communication system.

SUMMARY

The present disclosure provides a communication method, communication apparatus and device capable of implementing communication corresponding to a numerology supported by the wireless communication system.

Furthermore, in the first aspect, the present disclosure provides a communication method including: generating a first radio frame by a communication apparatus, a time domain length of the first symbol in the first radio frame exceeding any time domain length of any one of remaining symbols in the first radio frame; and transmitting the first radio frame by the communication apparatus.

In an embodiment of the present disclosure, the communication apparatus can communicate with other communication apparatuses by transmitting a frame corresponding to the supported numerology, the time domain length of the first symbol in the frame exceed any time domain length of the remaining symbols in the frame.

In one possible implementation, the sequence carried by the first symbol is known to the communication apparatus.

In an embodiment of the present disclosure, the communication apparatus receiving the first radio frame can perform a processing on the signal corresponding to the first symbol as a reference signal.

In one possible implementation, the communication method further includes: transmitting at least a second radio frame by the communication apparatus, all symbols in the second radio frame having a same time domain length.

In one possible implementation, the time domain length of the first symbol is 1/(15 kHz), and the time domain length of any one of the remaining symbols is $1/(15\ \text{kHz})/2^k$, wherein k is a positive integer.

In one possible implementation, the communication method further includes: generating a third radio frame by the communication apparatus, all symbols in the third radio frame having a same time domain length, sequences carried by first M symbols in the third radio frame being known to the communication apparatus, wherein M is a positive integer; and transmitting the third radio frame by the communication apparatus.

In an embodiment of the present disclosure, when a communication system supports multiple different numerologies, communication can be achieved by means of radio frames with different structures.

In one possible implementation, a total time domain length of the first M OFDM symbols is 1/(15 kHz).

In one possible implementation, a time domain length of each symbol in the third radio frame is $1/(15\ \text{kHz})/2^k$.

In one possible implementation, the communication apparatus is a base station, and the communication method further includes: transmitting, by the communication apparatus, indication information indicating that the terminal apparatus is to transmit the first radio frame to the communication apparatus, before receiving the first radio frame.

In one possible implementation, the communication apparatus is a terminal apparatus, and the communication method further includes: receiving, by the communication apparatus, indication information, transmitted by a base station, indicating that the base station is to transmit the first radio frame to the communication apparatus, before receiving the first radio frame.

In the second aspect of the present disclosure, there is provided a communication method including: generating a first radio frame by the communication apparatus, all symbols in the first radio frame having a same time domain length, sequences carried by first M symbols in the first radio frame being known to the communication apparatus, wherein M is a positive integer; and transmitting the first radio frame by the communication apparatus.

In an embodiment of the present disclosure, the communication apparatus can communicate with other communication apparatuses by transmitting a radio frame corresponding to the supported numerology, the sequences carried by the first M symbols in the radio frame are known.

In one possible implementation, a total time domain length of the first M OFDM symbols is 1/(15 kHz).

In one possible implementation, a time domain length of each symbol in the first radio frame is $1/(15\ \text{kHz})/2^k$, wherein k is a positive integer.

In one possible implementation, the communication apparatus is a base station, and the communication method further includes: transmitting, by the communication apparatus, indication information indicating that the communication apparatus is to transmit the first radio frame, before transmitting the first radio frame.

In one possible implementation, the communication apparatus is a terminal apparatus, and the communication method further includes: receiving, by the communication apparatus, indication information, transmitted by a base station, indicating that the communication apparatus is required to transmit the first radio frame to the base station, before transmitting the first radio frame.

In the third aspect of the present disclosure, there is provided a communication method including: receiving a first radio frame by a communication apparatus, a time domain length of the first symbol in the first radio frame exceeding any time domain length of any one of remaining symbols in the first radio frame; and performing a processing based on the first radio frame by the communication apparatus.

In an embodiment of the present disclosure, the communication apparatus can communicate with other communication apparatuses by receiving a frame corresponding to the supported numerology, the time domain length of the first symbol in the frame exceeds any time domain length of any one of remaining symbols in the frame.

In one possible implementation, a sequence carried by the first symbol is known to the communication apparatus.

In one possible implementation, the communication method further includes: receiving at least a second radio frame by the communication apparatus, all symbols in the second radio frame having a same time domain length.

In one possible implementation, the time domain length of the first symbol is 1/(15 kHz), and the time domain length of any one of the remaining symbols is $1/(15\ \text{kHz})/2^k$, wherein k is a positive integer.

In one possible implementation, the communication method further including: receiving a third radio frame by the communication apparatus, all symbols in the third radio frame having a same time domain length, sequences carried by first M symbols in the third radio frame being known to the communication apparatus, wherein M is a positive integer.

In an embodiment of the present disclosure, when a communication system supports different numerologies, communication can be achieved by means of radio frames with different structures.

In one possible implementation, a total time domain length of the first M OFDM symbols is 1/(15 kHz).

In one possible implementation, a time domain length of each symbol in the third radio frame is $1/(15\ \text{kHz})/2^k$.

In one possible implementation, the communication apparatus is a base station; and the communication method further includes: transmitting, by the communication apparatus, indication information to terminal apparatus indicating the terminal apparatus to transmit the third radio frame to the communication apparatus, before receiving the third radio frame.

In one possible implementation, the communication apparatus is a base station; and the communication method further includes: transmitting, by the communication apparatus, indication information to terminal apparatus indicating the terminal apparatus to transmit the first radio frame to the communication apparatus, before receiving the first radio frame.

In one possible implementation, the communication apparatus is a terminal apparatus; and the communication method further includes: receiving, by the communication apparatus, indication information, transmitted by a base station, indicating that the base station is to transmit the third radio frame to the communication apparatus, before receiving the third radio frame.

In one possible implementation, the communication apparatus is a terminal apparatus; and the communication method further includes: receiving, by the communication apparatus, indication information, transmitted by a base station, indicating that the base station is required to transmit the first radio frame to the communication apparatus, before receiving the first radio frame.

In the fourth aspect of the present disclosure, there is provided a communication method including: receiving a first radio frame by a communication apparatus; and sequences carried by first M symbols in the first radio frame being known to the communication apparatus, a time domain length of the first M symbols being equal to a time domain length of any one of remaining symbols, wherein M is a positive integer; and performing a processing based on the first radio frame by the communication apparatus.

In an embodiment of the present disclosure, the communication apparatus can communicate with other communication apparatuses by receiving a radio frame corresponding to the supported numerology, the sequences carried by the first M symbols in the radio frame are known.

In one possible implementation, a total time domain length of the first M OFDM symbols is 1/(15 kHz).

In one possible implementation, the time domain length of any one of the remaining symbols is $1/(15\ \text{kHz})/2^k$, wherein k is a positive integer.

In one possible implementation, the communication apparatus is a base station, and the communication method further includes: transmitting, by the communication apparatus, indication information to a terminal apparatus before receiving the first radio frame, the indication information indicating the terminal apparatus to transmit the first radio frame to the communication apparatus.

In one possible implementation, the communication apparatus is a terminal apparatus, and the communication method further includes: receiving, by the communication apparatus, indication information transmitted by a base station, before receiving the first radio frame, the indication information indicating that a base station is to transmit the first radio frame to the communication apparatus.

In the fifth aspect of the present disclosure, there is provided a communication apparatus, the communication apparatus includes modules for performing the communication method of the first aspect.

In the sixth aspect of the present disclosure, there is provided a communication apparatus, the communication apparatus includes modules for performing the communication method of the second aspect.

In the seventh aspect of the present disclosure, there is provided a communication apparatus, the communication apparatus includes modules for performing the communication method of the third aspect.

In the eighth aspect of the present disclosure, there is provided a communication apparatus, the communication apparatus includes modules for performing the communication method of the fourth aspect.

In the ninth aspect, the present disclosure provides a communication apparatus including a memory, a processor, a receiver, and a transmitter. The memory is used for storing code, the processor is used for executing code in the memory, and the receiver and the transmitter are used to communicate with other apparatuses. When the code is executed, the processor invokes the transmitter to implement the method of the first aspect.

In the tenth aspect, the present disclosure provides a communication apparatus including a memory, a processor, a receiver, and a transmitter. The memory is used for storing code, the processor is used for executing code in the memory, and the receiver and the transmitter are used to communicate with other apparatuses. When the code is executed, the processor invokes the transmitter to implement the method of the second aspect.

In the eleventh aspect, the present disclosure provides a communication apparatus including a memory, a processor, a receiver, and a transmitter. The memory is used for storing code, the processor is used for executing code in the memory, and the receiver and the transmitter are used to communicate with other apparatuses. When the code is executed, the processor invokes the transmitter to implement the method of the third aspect.

In the twelfth aspect, the present disclosure provides a communication apparatus including a memory, a processor, a receiver, and a transmitter. The memory is used for storing code, the processor is used for executing code in the memory, and the receiver and the transmitter are used to communicate with other apparatuses. When the code is executed, the processor invokes the transmitter to implement the method of the fourth aspect.

In the thirteenth aspect, the present disclosure provides a computer readable medium. The computer readable medium stores program for execution by a communication apparatus, and the program include instructions for performing the method of the first aspect.

In the fourteenth aspect, the present disclosure provides a computer readable medium. The computer readable medium stores program for execution by a communication apparatus, and the program include instructions for performing the method of the second aspect.

In the fifteenth aspect, the present disclosure provides a computer readable medium. The computer readable medium stores program for execution by a communication apparatus, and the program include instructions for performing the method of the third aspect.

In the sixteenth aspect, the present disclosure provides a computer readable medium. The computer readable medium stores program for execution by a communication apparatus, and the program include instructions for performing the method of the fourth aspect.

BRIEF DESCRIPTION OF THE DRAWINGS

In order to clearly illustrate the technical scheme of the embodiments of the present disclosure, the following is a brief introduction of the accompanying drawings herein to be used in the embodiment of the present disclosure. Apparently, the accompanying drawings in the following description show merely some embodiments of the present disclosure, and persons of ordinary skill in the art may still derive other drawings from these accompanying drawings without creative efforts.

DETAILED DESCRIPTION

In order to make the objective, technical solutions and advantages of the embodiments of the present disclosure clearer, the technical solutions in the embodiments of the present disclosure are clearly and completely described in the following with reference to the accompanying drawings in the embodiments of the present disclosure. Apparently, the embodiments described are part of the embodiments of the disclosure, not all of them. All other embodiments obtained by those skilled in the art based on the embodiments of the present disclosure without creative efforts are within the scope of the present disclosure.

To facilitate the understanding, an exemplary diagram of wireless communication system architecture capable of implementing the communication method of the embodiment of the present disclosure is described first. It should be understood that the embodiment of the present disclosure is not limited to the system architecture shown in FIG. 1. In addition, the apparatus in FIG. 1 may be hardware, or may be functionally divided software or the above two structures.

Figure 1:
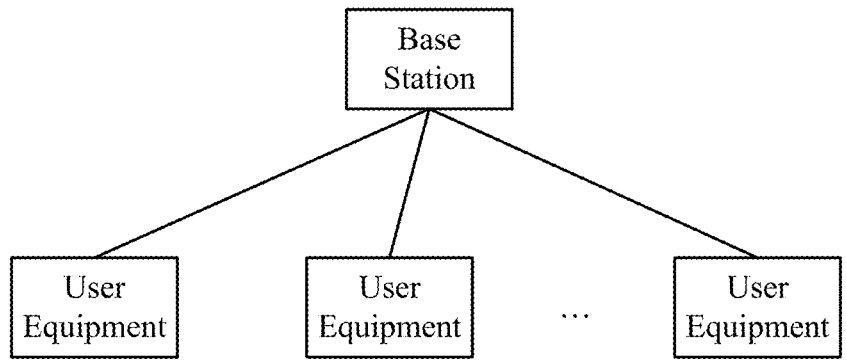
FIG. 1 schematically illustrates a communication system of a communication method according to an embodiment of the present disclosure.

The wireless communication system shown in FIG. 1 includes a base station and user equipment (User Equipment, UE). The base station and the UEs can communicate with each other, and the UEs can communicate with each other through the base station. It should be noted that the number of base station and the number of UEs in FIG. 1 should not limit the present disclosure.

In embodiments of the present disclosure, the base station may be a Global System for Mobile communication (GSM) system or a Base Transceiver Station (BTS) in a Code Division Multiple Access (CDMA) system, or may be a base station (NodeB) in a Wideband Code Division Multiple Access (WCDMA) system, which may also be an evolutional Node B (eNB or eNodeB) in an LTE system, or a base station and a small base station device in future 5G network and the like, and the present disclosure is not limited thereto.

In embodiments of the present disclosure, the UE may be referred to as an access terminal, a terminal apparatus, a subscriber unit, a subscriber station, a mobile station, a mobile station, a remote station, a remote terminal, a mobile device, a user terminal, a terminal, a wireless communication device, a user agent, or a user device, etc. The UE may be a cellular phone, a cordless phone, a Session Initiation Protocol (SIP) phone, a Wireless Local Loop (WLL) station, a Personal Digital Assistant (PDA), a handheld device with wireless communication function, a computing device, other processing devices connected to a wireless modem, an in-vehicle device, a wearable device, or a terminal apparatus in future 5G network.

Figure 2:
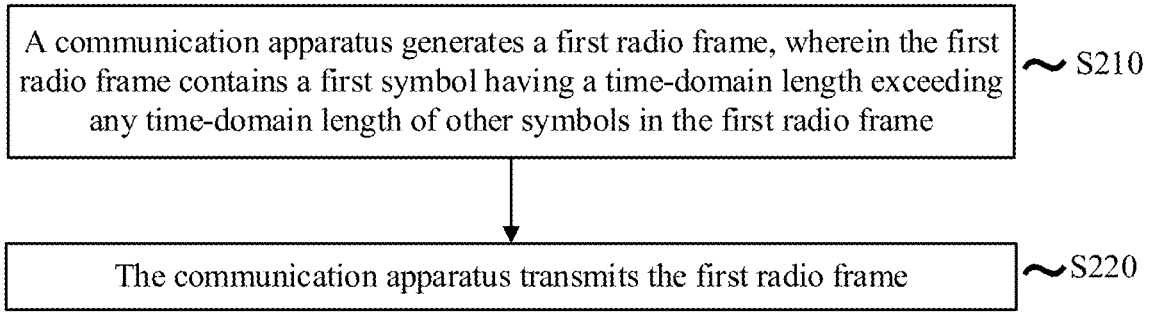
FIG. 2 schematically illustrates a communication method according to an embodiment of the present disclosure.

FIG. 2 schematically illustrates a communication method according to an embodiment of the present disclosure. It should be understood that FIG. 2 illustrates steps or operations of the communication method, but these steps or operations are merely examples, and embodiments of the present disclosure may perform other operations or variations of the various operations in FIG. 2.

In step S210, a communication apparatus generates a radio frame, a time domain length of the first symbol in the radio frame exceeds any time domain length of any one of remaining symbols in the radio frame. The first symbol in the radio frame is a start symbol in the radio frame, i.e., the first symbol is the first symbol in the time domain of the radio frame.

The communication apparatus may be the base station shown in FIG. 1, or may be the UE shown in FIG. 1. When the communication apparatus is a base station, the radio frame is a downlink frame; when the communication apparatus is a terminal apparatus, the radio frame is an uplink frame. The symbols in the radio frame may be Orthogonal Frequency Division Multiplexing (OFDM) symbols. The radio frame may also be a frame for short.

In step S220, the communication apparatus transmits the radio frame. In other words, a time domain length of the first symbol, transmitted by the communication apparatus, exceeds any time domain length of any one of remaining symbols in the radio frame.

In the embodiment of the present disclosure, the communication apparatus can communicate with other communication apparatuses by transmitting a frame, a time domain length of the first symbol in the frame exceeds the time domain length of any one of the remaining symbols in the frame.

FIG. 2 illustrates a communication method for a communication apparatus as a transmitting end. At the corresponding receiving end, the communication device receives the radio frame, and the time domain length of the first symbol in the radio frame exceeds the time domain length of any one of the remaining symbols in the first radio frame. Then the communication apparatus can perform a processing based on the radio frame.

In the embodiment of the present disclosure, the communication apparatus, as a receiving end, communicates with other communication apparatuses by receiving a frame, a time domain length of the first symbol in the frame exceeds the time domain length of any one of the remaining symbols in the frame.

The communication apparatus, as the receiving end, may be the base station shown in FIG. 1, or may be the terminal apparatus shown in FIG. 1. The symbols in the radio frame may also be OFDM symbols. The processing, which is performed by the communication apparatus based on the radio frame, may include performing automatic gain control (AGC) based on the first symbol in the radio frame, i.e., when the communication apparatus receives the radio frame, within the time domain length of the first symbol, the AGC can be performed on the receiving amplifying circuit in the communication apparatus according to the signal in the received first symbol.

Certainly, when the communication apparatus, as the transmitting end, transmits the radio frame, within the time domain length of the first symbol, the AGC can be performed on the transmission amplifying circuit in the communication apparatus according to the signal in the transmitted first symbol.

The time, during which the communication apparatus performs AGC such that the gains of the corresponding transmission amplifying circuit and the receiving amplifying circuit reach a stable level, can be referred to as AGC settling time.

In the embodiment of the present disclosure, the time domain length of the first symbol in the radio frame received or transmitted by the communication apparatus may be greater than or equal to the AGC settling time of the communication apparatus, so that the communication apparatus can complete the AGC adjustment within a time period of transmitting the signal corresponding to the first symbol or receiving the signal corresponding to the first symbol.

Specifically, when transmitting the radio frame, the communication apparatus can transmit a radio frame, and a time domain length of the first symbol in the radio frame exceeds the time domain length of any one of the remaining symbols and the time domain length of the first symbol is greater than or equal to the AGC settling time of the communication apparatus. When receiving the radio frame, the communications apparatus can receive a radio frame in which a time domain length of the first symbol exceeds the time domain length of any one of the remaining symbols and is greater than or equal to the AGC settling time of the communication apparatus.

Figures 3, 4:
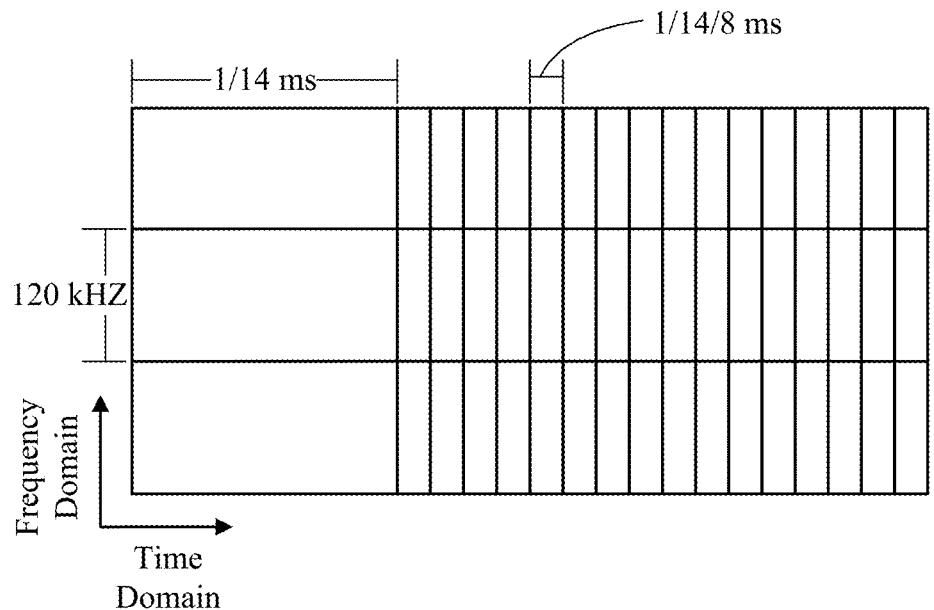
FIG. 3 schematically illustrates a radio frame in a communication method according to an embodiment of the present disclosure.
FIG. 4 schematically illustrates a communication method according to an embodiment of the present disclosure.

The following takes the current AGC settling time (about 20 us to 66.67 us) as an example, and introduces the radio frame of the embodiment of the present disclosure in conjunction with the frame structure shown in FIG. 3. As shown in FIG. 3, the interval of the radio frame transmitted or received by the communication apparatus is 120 kHz, and the time domain length of any one of the remaining symbols in the radio frame is 1/(15 kHz)/8 except the first symbol, the time domain length of the first symbol is 1/(15 kHz), which is about 66.67 us.

When the communication apparatus transmits the frame as shown in FIG. 3, since the time domain length 66.67 us of the first symbol is greater than the lower limit time 20 us of the AGC settling time of the communication apparatus, therefore the communication apparatus can complete the AGC adjustment of the transmission amplifying circuit based on the signal transmitted within a time period of transmitting the signal corresponding to the first symbol. When the communication apparatus receives the frame shown in FIG. 3, since the time domain length 66.67 us of the first symbol is greater than the lower limit time 20 us of the AGC settling time of the communication apparatus, therefore the communication apparatus can complete the AGC adjustment of the receiving amplifying circuit based on the signal received within a time period of receiving the signal corresponding to the first symbol.

In general, when the carrier interval of the radio frame is $15*2^k$ kHz, the time domain length of any one of the remaining symbols in the radio frame may be $1/(15 \text{ kHz})/2^k$ except the first symbol. At this time, an optional value of the time domain length of the first symbol is 1/(15 kHz).

In the embodiment of the present disclosure, the first symbol of the radio frame may use a specified sequence, i.e., a sequence carried by the first symbol is known to the communication apparatus. Specifically, the sequence carried by the first symbol in the radio frame is a sequence that is known or pre-agreed in advance to the communication apparatuses that transmit and receive the radio frame, i.e., the information carried by the first symbol is known to the communication apparatuses at both ends of the communication. The sequence may be configured to the communication apparatus by the base station or may be preset on the communication apparatus.

When the sequence carried by the first symbol in the radio frame is known, the communication apparatus (the user equipment shown in FIG. 1), as the receiving end, can also perform channel estimation by using the signal corresponding to the first symbol.

FIG. 4 schematically illustrates a communication method according to an embodiment of the present disclosure. It should be understood that FIG. 4 illustrates steps or operations of the communication method, but these steps or operations are merely examples, and embodiments of the present disclosure may perform other operations or variations of the various operations in FIG. 4.

In step S410, a communication apparatus generates a radio frame, all symbols in the radio frame have a same time domain length; and sequences carried by first M symbols in the radio frame are known to the communication apparatus, wherein M is a positive integer.

In other words, the first M symbols in the radio frame carry known sequences, and the time domain length of the symbols in the M symbols is equal to the time domain length of any one of the remaining symbols, which both are $1/(15 \text{ kHz})/2^k$.

The communication apparatus, as a receiving end, may be the base station shown in FIG. 1, or may be the UE shown in FIG. 1. The symbols in the radio frame may be OFDM symbols. The radio frame may also be a frame for short. The first M symbols of the radio frame refer to consecutive M symbols in the radio frame starting from the start position thereof.

In step S420, the communication apparatus transmits the radio frame.

In the embodiment of the present disclosure, the communication apparatus can communicate with other communication apparatuses by transmitting the radio frame of known sequences carried by first M symbols.

Optionally, a time domain length of each symbol in the radio frame is $1/(15 \text{ kHz})/2^k$, wherein k is a positive integer.

FIG. 4 schematically illustrates a communication method according to an embodiment of the present disclosure. At the corresponding receiving end, the communication apparatus receives the radio frame, and all symbols in the second radio frame have a same time domain length, and sequences carried by first M symbols in the radio frame are known to the communication apparatus. Then the communication apparatus can perform a processing based on the radio frame.

In the embodiment of the present disclosure, the communication apparatus, as the receiving end, can communicate with other communication apparatuses by receiving the radio frame of known sequences carried by first M symbols.

The communication apparatus, as the receiving end, may be the base station as illustrated in FIG. 1, or may be the user equipment as illustrated in FIG. 1. The symbol in the radio frame may be OFDM symbol. The processing, which is performed by the communication apparatus based on the radio frame, may include performing AGC based on the first M symbols in the radio frame. In other words, when the communication apparatus receives the radio frame, within the time domain length of the first M symbols, the AGC can be performed on the receiving amplifying circuit in the communication apparatus according to the signal in the received first M symbols.

Certainly, when the communication apparatus, as the transmitting end, transmits the radio frame, within the time domain length of the first M symbols, the AGC can be performed on the transmission amplifying circuit in the communication apparatus according to the signal in the transmitted first M symbols.

In the embodiment of the present disclosure, the time domain length of the first M symbols in the radio frame received or transmitted by the communication apparatus may be greater than or equal to the AGC settling time of the communication apparatus, so that the communication apparatus can complete the AGC adjustment within a time period of transmitting the signal corresponding to the first M symbols or receiving the signal corresponding to the first M symbols.

Specifically, when transmitting the radio frame, the communication apparatus can transmit known sequences carried by the first M symbols in a radio frame, and a time domain length of the first M symbols is greater than or equal to the AGC settling time of the communication apparatus. When receiving the radio frame, the communications apparatus can receive known sequences carried by the first M symbols in the radio frame, and the time domain length of the first M symbols is greater than or equal to the AGC settling time of the communication apparatus.

Figure 5:
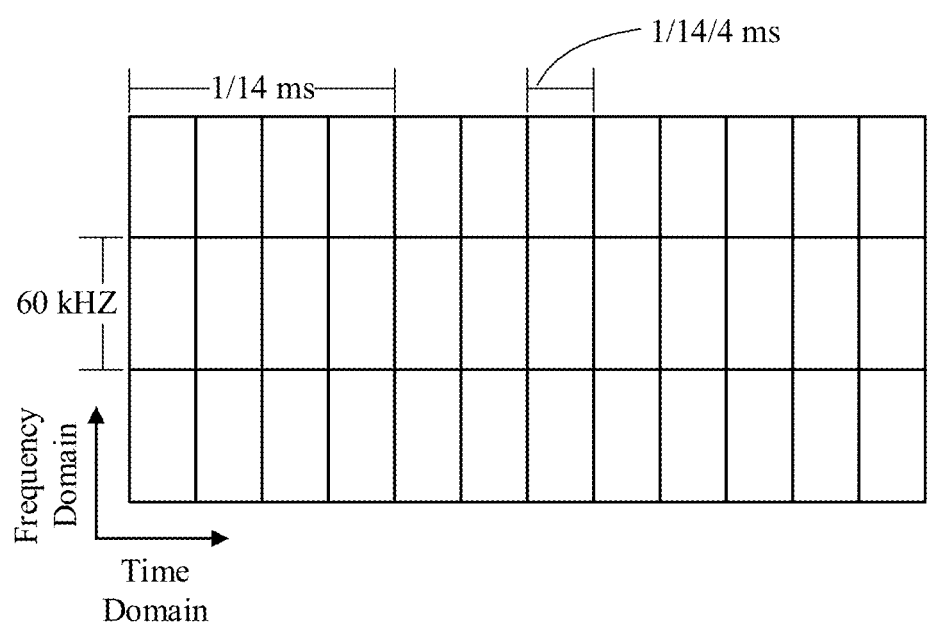
FIG. 5 schematically illustrates a radio frame in a communication method according to an embodiment of the present disclosure.

The following takes the current AGC settling time (about 20 us to 66.67 us) as an example, and introduces the radio frame of the embodiment of the present disclosure in conjunction with the frame structure shown in FIG. 5. As shown in FIG. 5, the interval of the radio frame transmitted or received by the communication apparatus is 60 kHz, and the time domain length of all symbols in the radio frame is $1/(15 \text{ kHz})/4$, the total time domain length of the first 4 symbols is $1/(15 \text{ kHz})$ (i.e., M=4), and the first 4 symbols carry known sequences.

When the communication apparatus transmits the frame shown in FIG. 5, since the total time domain length $1/14$ millisecond of the first 4 symbols is greater than the lower limit time 20 us of the AGC settling time of the communication apparatus, and the sequences carried by the first 4 symbols are known, therefore the communication apparatus can complete the AGC adjustment of the transmission amplifying circuit based on the signal transmitted within a time period of transmitting the signal corresponding to the first 4 symbols. When the communication apparatus receives the frame shown in FIG. 5, since the total time domain length $1/(15 \text{ kHz})$ of the first 4 symbols is greater than the lower limit time 20 us of the AGC settling time of the communication apparatus, and the sequences carried by the first 4 symbols are known, therefore the communication apparatus can complete the AGC adjustment of the receiving amplifying circuit based on the received signal within a time period of receiving the signal corresponding to the first 4 symbols.

In general, when the carrier interval of the radio frame is $15*2^k$ kHz, the time domain length of all symbols in the radio frame may be $1/(15 \text{ kHz})/2^k$. At this time, an optional value of the total time domain length of the first M symbols is $1/(15 \text{ kHz})$.

In the embodiment of the present disclosure, sequences carried by the first M symbols in the radio frame are known, i.e., the first M symbols in the radio frame carry specified sequences. Specifically, the sequences carried by the first M symbols in the radio frame are known or pre-agreed in advance to the communication apparatuses that transmit and receive the radio frame, i.e., the information carried by the first M symbols are known to the communication apparatuses at both ends of the communication. The sequence may be configured to the communication apparatus by the base station or may be preset on the communication apparatus.

Moreover, sine the sequence carried by the first M symbols in the radio frame are known, the communication apparatus (the user equipment shown in FIG. 1), as the receiving end, can also perform channel estimation by using the signal corresponding to the first M symbols.

In above embodiments of the present disclosure, the time domain length of the first symbol in the radio frame is greater than the time domain length of any one of the remaining symbols, the first symbol in the radio frame may be referred to as a training symbol; all symbols in the radio frame have the same time domain length and the first M symbols carry known sequences, the first M symbols in the radio frame may also be collectively referred to as training symbols.

In an embodiment of the present disclosure, optionally, when a communication apparatus continuously transmits a plurality of radio frames (including an uplink frame and a downlink frame), not all radio frames are required to include a training symbol, but only the first radio frame among the plurality of consecutive radio frames may include a training symbol, and any one of the remaining radio frames may not include a training symbol.

Specifically, when the communication apparatus continuously transmits a plurality of radio frames, the time domain length of the first symbol in the first radio frame is greater than the time domain length of any one of the remaining symbols in the radio frame. Starting from the second radio frame, all the symbols in the radio frame have the same time domain length; or all the symbols in each radio frame of the plurality of consecutive radio frames have the same time domain length, but only the first M symbols in the first radio frame carry known sequences.

When the communication apparatus, such as the user equipment, is required to continuously transmit a plurality of radio frames, the base station may transmit a scheduling instruction (or indication information) to the terminal apparatus to indicate that the terminal apparatus transmits information of symbols in the plurality of radio frames; The apparatus receives information, transmitted by the base station, to indicate symbols in the radio frame. For example, the base station transmits a scheduling instruction to the terminal apparatus to indicate whether the first radio frame of the plurality of radio frames, transmitted by the terminal apparatus to the base station, includes training symbols, i.e., the terminal apparatus is indicated to transmit a radio frame to the base station, and a time domain length of the first symbol in the radio frame is greater than the time domain length of any one of the remaining symbols, or the terminal apparatus is indicated to transmit a radio frame to the base station, and all the symbols in the radio frame have the same time domain length, and the first M symbols in the radio frame carry known sequences. If the first radio frame includes training symbols, the base station may further transmit a scheduling instruction to the terminal apparatus to indicate the number information of symbols occupied by the training symbols in the radio frame and the time domain length information of the training symbols, and/or indicate whether any one of the remaining radio frames includes a training symbol. Correspondingly, the terminal apparatus receives the scheduling instruction transmitted by the base station.

Optionally, when a base station is required to continuously transmit a plurality of radio frames to the terminal apparatus, the base station may transmit a scheduling instruction to the terminal apparatus to indicate that the base station transmits the information of symbols in the plurality of radio frames, so that terminal apparatus receives the plurality of radio frames based on the information of the symbols. For example, the base station transmits a scheduling instruction to the terminal apparatus to indicate whether the first radio frame of the plurality of radio frames, transmitted by the terminal apparatus to the base station, includes training symbols. If the first radio frame includes training symbols, the base station may further transmit a scheduling instruction to the terminal apparatus to indicate the number information of symbols occupied by the training symbols in the radio frame and the time domain length information of the training symbols, and/or indicate whether any one of the remaining radio frames includes a training symbol. Correspondingly, the terminal apparatus receives the scheduling instruction transmitted by the base station.

For example, when the terminal apparatus is required to control the transmit power, i.e., the terminal apparatus is required to increase or decrease the transmit power of some radio frames. The terminal apparatus may transmit the first radio frame, which includes training symbols, of these radio frames according to the indication of the scheduling instruction of the base station. Specifically, the time domain length of the first symbol in the first radio frame transmitted by the terminal apparatus is greater than the time domain length of any one of the remaining symbols; or the time domain length of all symbols in the first radio frame transmitted by the terminal apparatus is equal, and the first M symbols carry known sequences.

In an embodiment of the present disclosure, when a communication system in which a communication apparatus is located can support multiple numerologies, different numerologies can correspond to radio frames of different structures, i.e., a communication apparatus in a communication system can use various communication methods. In other words, when a plurality of numerologies are supported in the communication system, the communication apparatus, as the transmitting end, can communicate with other communication apparatuses using both the communication method shown in FIG. 2 and the communication method shown in FIG. 4.

For example, when the communication apparatus supports multiple numerologies, the communication apparatus may generate a radio frame in which the time domain length of the first symbol is greater than the time domain length of any one of the remaining symbols, and transmit the radio frame; then the communication apparatus may also generate a radio frame in which all symbols have the same time domain length and the sequences carried by the first M symbols are known to the communication apparatus, and transmit the radio frame.

Correspondingly, the communication apparatus, as the receiving end, can receive not only the radio frame in which the time domain length of the first symbol is greater than the time domain length of any one of the remaining symbols, and perform a processing based on the radio frame, but also the radio frame in which all symbols have the same time domain length and the sequences carried by the first M symbols are known to the communication apparatus, and perform a processing based on the radio frame.

For example, when there are two subcarrier intervals of 120 kHz and 60 kHz in the communication system, if the communication apparatus communicates with other communication apparatuses through the subcarrier interval of 120 kHz, the communication apparatus can generate a radio frame in which the time domain length of the first symbol is greater than the time domain of any one of the remaining symbols, and transmit the radio frame. If the communication apparatus communicates with other communication apparatuses through the subcarrier interval of 60 kHz, the communication apparatus can generate a radio frame in which all symbols have the same time domain length and the sequences carried by the first M symbols are known to the communication apparatus.

For example, the base station can inform (e.g., by broadcast or dedicated signaling) information of the numerology used in the current communication system to the terminal apparatus. The base station may also use broadcast or dedicated signaling to inform the terminal apparatus to use the radio frame, in which the time domain length of the first symbol is greater than the time domain length of any one of the remaining symbols, and/or all symbols have the same time domain length and the sequences carried by the first M symbols are known to the communication apparatus, to communicate with the base station, The communication method of the present disclosure has been described above with reference to FIG. 1 to FIG. 5, and the communication apparatus of the present disclosure will be described below with reference to FIG. 6 to FIG. 13.

Figure 6:
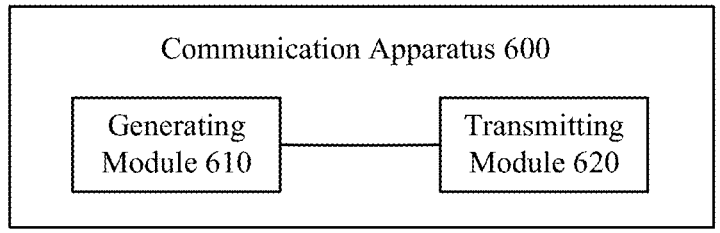
FIG. 6 schematically illustrates a communication apparatus according to an embodiment of the present disclosure.

FIG. 6 schematically illustrates a communication apparatus according to an embodiment of the present disclosure. It should be understood that the communication apparatus 600 shown in FIG. 6 is merely an example, and the communication apparatus of the embodiment of the present apparatus may further include other modules or units, or include modules having similar functions to respective modules shown in FIG. 6, or include not all modules shown in FIG. 6.

The generating module 610 is configured to generate a first radio frame, a time domain length of the first symbol in the first radio frame exceeds any time domain length of any one of remaining symbols in the first radio frame.

The transmitting module 620 is configured to transmit the first radio frame.

In an embodiment of the present disclosure, the communication apparatus can communicate with other communication apparatuses by transmitting a frame in which a time domain length of the first symbol exceeds the time domain length of any one of the remaining symbols.

Optionally, as an embodiment, the sequence carried by the first symbol is known to the communication apparatus.

In an embodiment of the present disclosure, the communication apparatus receiving the first radio frame can be configured to process the signal corresponding to the first symbol as a reference signal.

Optionally, as an embodiment, the transmitting module is also configured to transmit at least a second radio frame, all symbol in the second radio frame have the same time domain length.

Optionally, as an embodiment, the time domain length of the first symbol is 1/(15 kHz), and the time domain length of any one of the remaining symbols is $1/(15 \text{ kHz})/2^k$, wherein k is a positive integer.

Optionally, as an embodiment, the generating module is also configured to generate a third radio frame, all symbols in the third radio frame have a same time domain length; and sequences carried by first M symbols in the third radio frame are known to the communication apparatus, wherein M is a positive integer. The transmitting module is also configured to transmit the third radio frame.

Optionally, as an embodiment, a total time domain length of the first M OFDM symbols is 1/(15 kHz).

Optionally, as an embodiment, a time domain length of each symbol in the third radio frame is $1/(15 \text{ kHz})/2^k$, wherein k is a positive integer.

Optionally, as an embodiment, the communication apparatus is a base station, wherein, the transmitting module is also configured to transmit indication information indicating that the communication apparatus is to transmit the third radio frame, before transmitting the third radio frame.

Optionally, as an embodiment, the communication apparatus is a base station, wherein, the transmitting module is also configured to transmit indication information indicating that the communication apparatus is to transmit the first radio frame, before transmitting the first radio frame.

Optionally, as an embodiment, the communication apparatus is a terminal apparatus, wherein, the transmitting module is also configured to receive indication information transmitted by a base station before transmitting the third radio frame, the indication information indicating that the communication apparatus is required to transmit the third radio frame to the base station.

Optionally, as an embodiment, the communication apparatus is a terminal apparatus, wherein, the transmitting module is also configured to receive indication information transmitted by a base station before transmitting the first radio frame, the indication information indicating that the communication apparatus is required to transmit the first radio frame to the base station.

It should be understood that the communication apparatus 600 shown in FIG. 6 can perform various steps of the communication apparatus in the communication method shown in FIG. 2, and details are not described herein for brevity.

Figure 7:
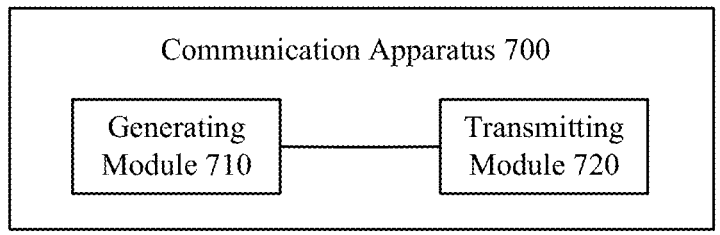
FIG. 7 schematically illustrates a communication apparatus according to an embodiment of the present disclosure.

FIG. 7 schematically illustrates a communication apparatus according to an embodiment of the present disclosure. It should be understood that the communication apparatus 700 shown in FIG. 7 is merely an example, and the communication apparatus of the embodiment of the present apparatus may further include other modules or units, or include modules having similar functions to respective modules shown in FIG. 7, or include not all modules shown in FIG. 7.

The generating module 710 is configured to generate a first radio frame, all symbols in the first radio frame have a same time domain length, and sequences carried by first M symbols in the first radio frame are known to the communication apparatus, wherein M is a positive integer.

The known sequence refer to that the sequence carried by the first symbol in the radio frame are known or pre-agreed in advance to the communication apparatuses that transmit and receive the radio frame, i.e., the information carried by the first symbol is known to the communication apparatuses at both ends of the communication. The sequence may be configured to the communication apparatus by the base station or may be preset on the communication apparatus.

The transmitting module 720 is configured to transmit the first radio frame.

In an embodiment of the present disclosure, the communication apparatus can communicate with other communication apparatuses by transmitting a radio frame in which the sequences carried by the first M symbols are known.

Optionally, as an embodiment, a total time domain length of the first M OFDM symbols is 1/(15 kHz).

Optionally, as an embodiment, a time domain length of each symbol in the first radio frame is $1/(15 \text{ kHz})/2^k$, wherein k is a positive integer.

Optionally, as an embodiment, the communication apparatus is a base station, wherein, the transmitting module is also configured to transmit indication information indicating that the communication apparatus is to transmit the first radio frame, before transmitting the first radio frame.

Optionally, as an embodiment, the communication apparatus is a terminal apparatus, wherein, the transmitting module is also configured to receive indication information transmitted by a base station before transmitting the first radio frame, the indication information indicating that the communication apparatus is required to transmit the first radio frame to the base station.

It should be understood that the communication apparatus 700 shown in FIG. 7 can perform various steps of the communication apparatus in the communication method shown in FIG. 4, and details are not described herein for brevity.

Figure 8:
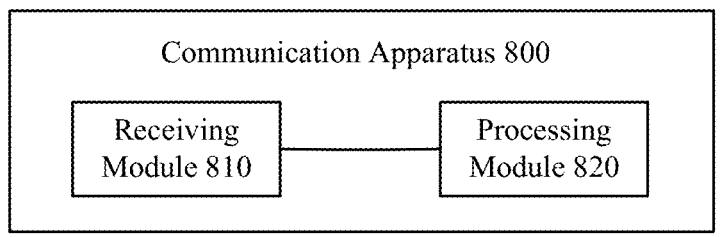
FIG. 8 schematically illustrates a communication apparatus according to an embodiment of the present disclosure.

FIG. 8 schematically illustrates a communication apparatus according to an embodiment of the present disclosure. It should be understood that the communication apparatus 800 shown in FIG. 8 is merely an example, and the communication apparatus of the embodiment of the present apparatus may further include other modules or units, or include modules having similar functions to respective modules shown in FIG. 8, or include not all modules shown in FIG. 8.

The receiving module 810 is configured to receive a first radio frame, a time domain length of the first symbol in the first radio frame exceeds any time domain length of any one of remaining symbols in the first radio frame.

The processing module 820 is configured to perform a processing based on the first radio frame.

In an embodiment of the present disclosure, the communication apparatus can communicate with other communication apparatuses by receiving a frame in which a time domain length of the first symbol exceeds the time domain length of any one of the remaining symbols.

Optionally, as an embodiment, the sequence carried by the first symbol is known to the communication apparatus.

The known sequence refer to that the sequence carried by the first symbol in the radio frame are known or pre-agreed in advance to the communication apparatuses that transmit and receive the radio frame, i.e., the information carried by the first symbol is known to the communication apparatuses at both ends of the communication. The sequence may be configured to the communication apparatus by the base station or may be preset on the communication apparatus.

Optionally, as an embodiment, the receiving module is also configured to receive at least a second radio frame, all symbol in the second radio frame have the same time domain length.

Optionally, as an embodiment, a total time domain length of the first M OFDM symbols is 1/(15 kHz).

Optionally, as an embodiment, a time domain length of each symbol in the third radio frame is $1/(15 \text{ kHz})/2^k$, wherein k is a positive integer.

Optionally, as an embodiment, the receiving module is configured to receive a third radio frame, all symbols in the third radio frame have a same time domain length, and sequences carried by first M symbols in the third radio frame are known to the communication apparatus, wherein M is a positive integer.

Optionally, as an embodiment, a total time domain length of the first M OFDM symbols is 1/(15 kHz).

Optionally, as an embodiment, a time domain length of each symbol in the third radio frame is $1/(15 \text{ kHz})/2^k$, wherein k is a positive integer.

Optionally, as an embodiment, the communication apparatus is a base station, wherein, the communication apparatus includes a first transmitting module configured to transmit indication information to a terminal apparatus before the receiving module receiving the third radio frame, the indication information indicating the terminal apparatus to transmit the third radio frame to the communication apparatus.

Optionally, as an embodiment, the communication apparatus is a base station, wherein, the communication apparatus including a second transmitting module configured to transmit indication information to a terminal apparatus before the receiving module receiving the first radio frame, the indication information indicating the terminal apparatus to transmit the first radio frame to the communication apparatus.

Optionally, as an embodiment, the communication apparatus is a terminal apparatus, wherein, the receiving module is also configured to receive indication information, transmitted by a base station, before receiving the third radio frame, the indication information indicating that the base station is to transmit the third radio frame to the communication apparatus.

Optionally, as an embodiment, the communication apparatus is a terminal apparatus, wherein, the receiving module is also configured to receive indication information, transmitted by a base station, before receiving the first radio frame, the indication information indicating that the base station is to transmit the first radio frame to the communication apparatus.

Figure 9:
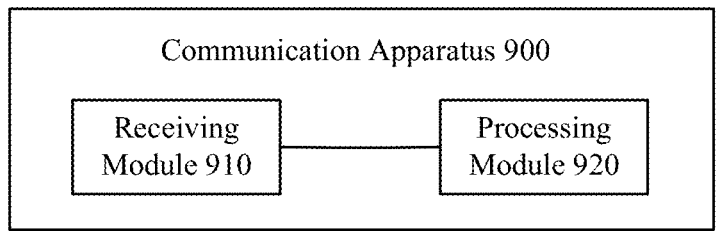
FIG. 9 schematically illustrates a communication apparatus according to an embodiment of the present disclosure.

FIG. 9 schematically illustrates a communication apparatus according to an embodiment of the present disclosure. It should be understood that the communication apparatus 900 shown in FIG. 9 is merely an example, and the communication apparatus of the embodiment of the present apparatus may further include other modules or units, or include modules having similar functions to respective modules shown in FIG. 9, or include not all modules shown in FIG. 9.

The receiving module 910 is configured to receive a first radio frame, sequences carried by first M symbols in the first radio frame are known to the communication apparatus, and a time domain length of the first M symbols is equal to a time domain length of any one of remaining symbols, wherein M is a positive integer.

The processing module 920 is configured to perform a processing based on the first radio frame.

In an embodiment of the present disclosure, the communication apparatus can communicate with other communication apparatuses by receiving a frame in which sequences carried by first M symbols are known.

The known sequences refer to that the sequences carried by the first M symbols in the radio frame are known or pre-agreed in advance to the communication apparatuses that transmit and receive the radio frame, i.e., the information carried by the first M symbols is known to the communication apparatuses at both ends of the communication. The sequences may be configured to the communication apparatus by the base station or may be preset on the communication apparatus.

Optionally, as an embodiment, a total time domain length of the first M OFDM symbols is 1/(15 kHz).

Optionally, as an embodiment, a time domain length of any one of the remaining symbols is $1/(15 \text{ kHz})/2^k$, wherein k is a positive integer.

Optionally, as an embodiment, the communication apparatus is a base station, wherein, the communication apparatus including a transmitting module configured to transmit indication information to a terminal apparatus before the receiving module receiving the first radio frame, the indication information indicating the terminal apparatus to transmit the first radio frame to the communication apparatus.

Optionally, as an embodiment, the communication apparatus is a terminal apparatus, wherein, the receiving module is also configured to receive indication information transmitted by a base station, before receiving the first radio frame, the indication information indicating that the base station is to transmit the first radio frame to the communication apparatus.

Figure 10:
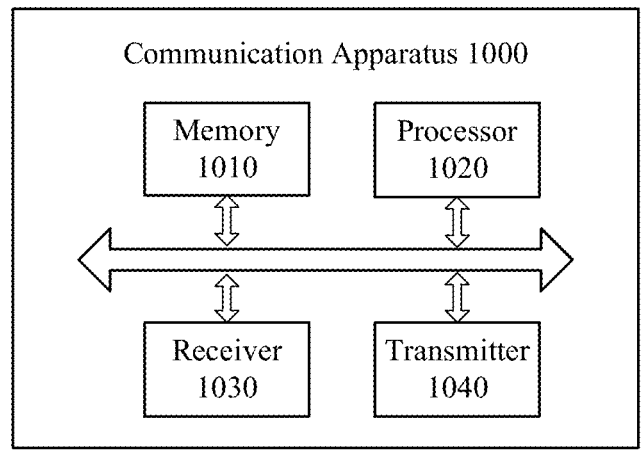
FIG. 10 schematically illustrates a communication apparatus according to an embodiment of the present disclosure.

FIG. 10 schematically illustrates a communication apparatus according to an embodiment of the present disclosure. The communication apparatus 1000 shown in FIG. 10 includes a processor 1020, a memory 1010, a receiver 1030, and a transmitter 1040.

The memory 1010 is configured to store a program.

The processor 1020 is configured to execute the program stored by the memory 1010.

When the processor 1020 executes the program stored in the memory 1010, the processor 1020 is configured to generate a first radio frame, and a time domain length of the first symbol in the first radio frame exceed any time domain length of any one of remaining symbols in the first radio frame.

When the processor 1020 executes the program stored in the memory 1010, the transmitter 1040 is configured to transmit the first radio frame.

In an embodiment of the present disclosure, the communication apparatus can communicate with other communication apparatuses by receiving a frame, and a time domain length of the first symbol in the frame exceed any time domain length of any one of remaining symbols in the frame.

Optionally, as an embodiment, sequences carried by the first symbol are known to the communication apparatus.

In an embodiment of the present disclosure, the communication apparatus receiving the first radio frame can be configured to process the signal corresponding to the first symbol as a reference signal.

Optionally, as an embodiment, the transmitter 1040 is also configured to transmit at least one second radio frame, all symbol in the second radio frame have the same time domain length.

Optionally, as an embodiment, the time domain length of the first symbol is 1/(15 kHz), and the time domain length of any one of the remaining symbols is $1/(15 \text{ kHz})/2^k$, wherein k is a positive integer.

Optionally, as an embodiment, the processor is also configured to generate a third radio frame, all symbols in the third radio frame have a same time domain length; and sequences carried by first M symbols in the third radio frame are known to the communication apparatus, wherein M is a positive integer. The transmitter is also configured to transmit the third radio frame.

Optionally, as an embodiment, a total time domain length of the first M OFDM symbols is 1/(15 kHz).

Optionally, as an embodiment, a time domain length of each symbol in the third radio frame is $1/(15 \text{ kHz})/2^k$, wherein k is a positive integer.

Optionally, as an embodiment, the communication apparatus is a base station, wherein, the transmitter is also configured to transmit indication information indicating that the communication apparatus is to transmit the third radio frame, before transmitting the third radio frame.

Optionally, as an embodiment, the communication apparatus is a base station, wherein, the transmitter is also configured to transmit indication information indicating that the communication apparatus is to transmit the first radio frame, before transmitting the first radio frame.

Optionally, as an embodiment, the communication apparatus is a terminal apparatus, wherein, the transmitter is also configured to receive indication information, transmitted by a base station, indicating that the communication apparatus is required to transmit the third radio frame to the base station, before transmitting the third radio frame.

Optionally, as an embodiment, the communication apparatus is a terminal apparatus, wherein, the transmitter is also configured to receive indication information, transmitted by a base station, indicating that the communication apparatus is required to transmit the first radio frame to the base station, before transmitting the first radio frame.

It should be understood that the communication apparatus 1000 shown in FIG. 10 can perform various steps of the communication apparatus in the communication method shown in FIG. 2, and details are not described herein for brevity.

Figure 11:
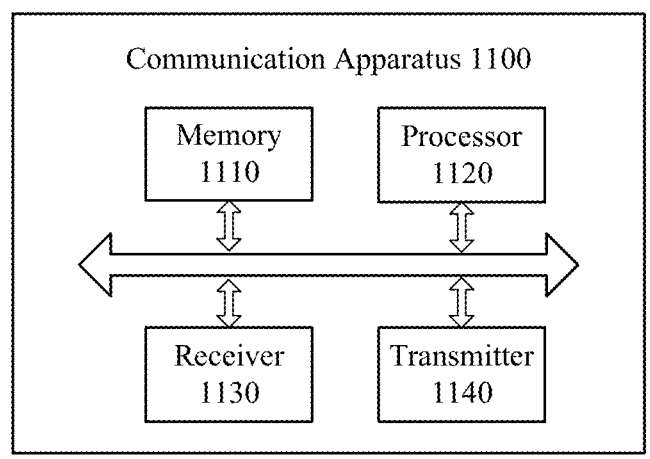
FIG. 11 schematically illustrates a communication apparatus according to an embodiment of the present disclosure.

FIG. 11 schematically illustrates a communication apparatus according to an embodiment of the present disclosure. The communication apparatus 1100 shown in FIG. 11 includes a processor 1120, a memory 1110, a receiver 1130, and a transmitter 1140.

The memory 1110 is configured to store a program.

The processor 1120 is configured to execute the program stored by the memory 1110.

When the processor 1120 executes the program stored in the memory 1110, the processor 1120 is configured to generate a first radio frame, and all symbols in the first radio frame have a same time domain length. The sequences carried by the first M symbols are known to the communication apparatus. A time domain length of each symbol in the first radio frame is $1/(15 \text{ kHz})/2^k$, wherein k is a positive integer and M is a positive integer.

When the processor 1120 executes the program stored in the memory 1110, the transmitter 1140 is configured to transmit the first radio frame.

In an embodiment of the present disclosure, the communication apparatus can communicate with other communication apparatuses by transmitting a frame, and the sequences carried by first M symbols in the frame are known.

Optionally, as an embodiment, a total time domain length of the first M OFDM symbols is 1/(15 kHz).

Optionally, as an embodiment, the communication apparatus is a base station, wherein, the transmitter is also configured to transmit indication information indicating that the communication apparatus is to transmit the first radio frame, before transmitting the first radio frame.

Optionally, as an embodiment, the communication apparatus is a terminal apparatus, wherein, the transmitter is also configured to receive indication information, transmitted by a base station, indicating that the communication apparatus is required to transmit the first radio frame to the base station, before transmitting the first radio frame.

It should be understood that the communication apparatus 1100 shown in FIG. 11 can perform various steps of the communication apparatus in the communication method shown in FIG. 4, and details are not described herein for brevity.

Figure 12:
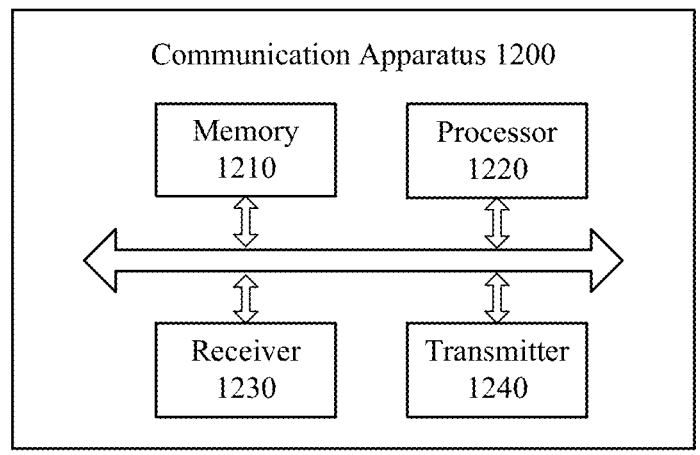
FIG. 12 schematically illustrates a communication apparatus according to an embodiment of the present disclosure.

FIG. 12 schematically illustrates a communication apparatus according to an embodiment of the present disclosure. The communication apparatus 1200 shown in FIG. 11 includes a processor 1220, a memory 1210, a receiver 1230, and a transmitter 1240.

The memory 1210 is configured to store a program.

The processor 1220 is configured to execute the program stored by the memory 1210.

When the processor 1220 executes the program stored in the memory 1210, the receiver 1230 is configured to receive a first radio frame, and a time domain length of the first symbol in the first radio frame exceed any time domain length of any one of remaining symbols in the first radio frame.

The processor 1220 is specifically configured to perform a processing based on the first radio frame.

In an embodiment of the present disclosure, the communication apparatus can communicate with other communication apparatuses by receiving a frame, and a time domain length of the first symbol in the frame exceed any time domain length of any one of remaining symbols in the frame.

Optionally, as an embodiment, sequence carried by the first symbol is known to the communication apparatus.

Optionally, as an embodiment, the receiver 1230 is also configured to receive at least one second radio frame, all symbol in the second radio frame have the same time domain length.

Optionally, as an embodiment, the time domain length of the first symbol is 1/(15 kHz), and the time domain length of any one of the remaining symbols is $1/(15 \text{ kHz})/2^k$, wherein k is a positive integer.

Optionally, as an embodiment, the receiver is also configured to receive a third radio frame, all symbols in the third radio frame have a same time domain length; and sequences carried by first M symbols in the third radio frame are known to the communication apparatus, wherein M is a positive integer.

Optionally, as an embodiment, a total time domain length of the first M OFDM symbols is 1/(15 kHz).

Optionally, as an embodiment, a time domain length of each symbol in the third radio frame is $1/(15 \text{ kHz})/2^k$, wherein k is a positive integer.

Optionally, as an embodiment, the communication apparatus is a base station, wherein, the transmitter is configured to transmit indication information to a terminal apparatus before the receiver receiving the third radio frame, the indication information indicating the terminal apparatus to transmit the third radio frame to the communication apparatus.

Optionally, as an embodiment, the communication apparatus is a base station, wherein, the transmitter is configured to transmit indication information to a terminal apparatus before the receiver receiving the first radio frame, the indication information indicating the terminal apparatus to transmit the first radio frame to the communication apparatus.

Optionally, as an embodiment, the communication apparatus is a terminal apparatus, wherein, the receiver is also configured to receive indication information, transmitted by a base station, before receiving the third radio frame, the indication information indicating that the base station is to transmit the third radio frame to the communication apparatus.

Optionally, as an embodiment, the communication apparatus is a terminal apparatus, wherein, the receiver is also configured to receive indication information, transmitted by a base station, before receiving the first radio frame, the indication information indicating that the base station is to transmit the first radio frame to the communication apparatus.

Figure 13:
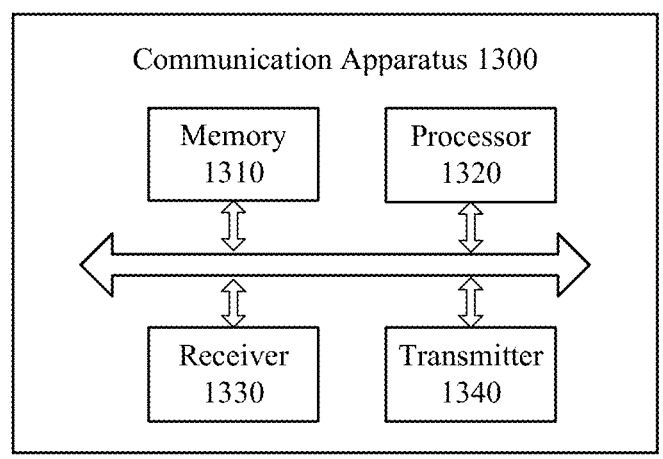
FIG. 13 schematically illustrates a communication apparatus according to an embodiment of the present disclosure.

FIG. 13 schematically illustrates a communication apparatus according to an embodiment of the present disclosure. The communication apparatus 1300 shown in FIG. 13 includes a processor 1320, a memory 1310, a receiver 1330, and a transmitter 1340.

The memory 1310 is configured to store a program.

The processor 1320 is configured to execute the program stored by the memory 1310.

When the processor 1320 executes the program stored in the memory 1310, the processor 1320 is configured to generate a first radio frame, and all symbols in the first radio frame have a same time domain length. The sequences carried by the first M symbols are known to the communication apparatus. A time domain length of the first M symbols is equal to a time domain length of any one of remaining symbols, wherein M is a positive integer. A time domain length of any one of the remaining symbols is $1/(15 \text{ kHz})/2^k$, wherein k is a positive integer.

The processor 1320 is specifically configured to perform a processing based on the first radio frame.

In an embodiment of the present disclosure, the communication apparatus can communicate with other communication apparatuses by receiving a frame, and the sequences carried by first M symbols in the frame are known.

Optionally, as an embodiment, a total time domain length of the first M OFDM symbols is 1/(15 kHz).

Optionally, as an embodiment, the communication apparatus is a base station, wherein, the transmitter is configured to transmit indication information to a terminal apparatus before the receiver receiving the first radio frame, the indication information indicating the terminal apparatus to transmit the first radio frame to the communication apparatus.

Optionally, as an embodiment, the communication apparatus is a terminal apparatus, wherein, the receiver is also configured to receive indication information transmitted by a base station, before receiving the first radio frame, the indication information indicating that the base station is to transmit the first radio frame to the communication apparatus.

It can be understood that the processor in the embodiment of the present disclosure may be an integrated circuit chip with signal processing capability. In the implementation process, each step of the foregoing method embodiments may be completed by an integrated logic circuit of hardware in a processor or an instruction in a form of software. The processor may be a general-purpose processor, a Digital Signal Processor (DSP), an Application Specific Integrated Circuit (ASIC), a Field Programmable Gate Array (FPGA), other programming logic devices, discrete gates, transistor logic devices, or discrete hardware components. The methods, steps, and logical block diagrams disclosed in the embodiments of the present disclosure may be implemented or carried out. The general processor may be a microprocessor, the processor, any conventional processor or the like. The steps of the method disclosed in the embodiments of the present disclosure may be directly implemented by the hardware decoding processor, or may be performed by a combination of hardware and software modules in the decoding processor. The software module can be located in a conventional storage medium such as random access memory, flash memory, read only memory, programmable read only memory electrically erasable programmable memory, registers, or the like. The storage medium is located in the memory, and the processor reads the information in the memory and combines the hardware to complete the steps of the above method.

It is to be understood that the memory in the embodiments of the present disclosure may be a volatile memory, a non-volatile memory or may include both volatile and non-volatile memory. The non-volatile memory may be a Read-Only Memory (ROM), a Programmable Read Only Memory (PROM), an Erasable Programmable Read Only Memory (Erasable PROM, EPROM), an electric Erase programmable read only memory (EEPROM) or flash memory. The volatile memory can be a Random Access Memory (RAM) that acts as an external cache. Many forms of RAM are available through exemplary but not restrictive instructions, such as Static Random Access Memory (SRAM), Dynamic Random Access Memory (DRAM), Synchronous Dynamic Random Access Memory (SDRAM), Double Data Rate SDRAM (DDR SDRAM), Enhanced Synchronous Dynamic Random Access Memory (ESDRAM), Synchronous Connection Dynamic Random Access Memory (SLDRAM)) and Direct Memory Bus Random Access Memory (DR RAM). It should be noted that the memories of the systems and methods described herein are intended to comprise, without being limited to, these and any other suitable types of memory.

Additionally, the terms "system" and "network" are used interchangeably herein. The term "and/or" in this context is merely an association describing the associated object, indicating that there may be three relationships, for example, A and/or B, which may indicate that there are three cases where A exists separately, both A and B exist and B exists separately. In addition, the character "/" in this disclosure generally indicates that the contextual object is in an "or" relationship.

It should be understood that in the embodiment of the present disclosure, "B corresponding to A" means that B is associated with A, and B can be determined according to A. However, it should also be understood that B can be determined according to A does not mean that B is determined solely from A, and that B can also be determined based on A and/or other information.

Those of ordinary skill in the art will appreciate that the elements and algorithm steps of the various examples described in connection with the embodiments disclosed herein can be implemented in electronic hardware or a combination of computer software and electronic hardware. Whether these functions are performed in hardware or software depends on the specific application and design constraints of the solution. A person skilled in the art can use different methods for implementing the described functions for each particular application, but such implementation should not be considered to be beyond the scope of the present disclosure.

Those of ordinary skill in the art can clearly understand that for the convenience and brevity of the description, the specific working process of the system, the device and the unit described above can refer to the corresponding process in the foregoing method embodiment, and details are not described herein again.

In the several embodiments provided by the present disclosure, it should be understood that the disclosed systems, devices, and methods may be implemented in other manners. For example, the device embodiments described above are merely illustrative. For example, the division of the unit is only a logical function division. In actual implementation, there may be another division manner, for example, multiple units or components may be combined or integrated into another system, or some features can be ignored or not executed. In addition, the coupling or direct coupling or communication connection shown or discussed may be an indirect coupling or communication connection through some interface, device or unit, and may be electrical, mechanical or otherwise.

The units described as separate components may or may not be physically separated, and the components displayed as units may or may not be physical units, i.e., may be located in one place, or may be distributed to multiple network units. Some or all of the units may be selected according to actual needs to achieve the purpose of the solution of the embodiments.

In addition, each functional unit in each embodiment of the present disclosure may be integrated into one processing unit, each unit existing physically separately, or two or more units integrated into one unit.

The functions may be stored in a computer readable storage medium if implemented in the form of a software functional unit and sold or used as a standalone product. Based on such understanding, the technical solution of the present disclosure, which is essential, contributes to the prior art, or is a part of the technical solution, may be embodied in the form of a software product, which is stored in a storage medium, including the instructions are used to make a computer device (which may be a personal computer, server, or network device, etc.) to perform all or part of the steps of the methods described in various embodiments of the present disclosure. The foregoing storage medium includes: a U disk, a mobile hard disk, a read-only memory (ROM), a random access memory (RAM), a magnetic disk, or an optical disk, and the like, which can store program codes.

The above is only the specific embodiment of the present disclosure, but the scope of the present disclosure is not limited thereto, and any person skilled in the art can easily think of changes or substitutions within the technical scope of the present disclosure. It should be covered by the scope of the present disclosure. Therefore, the scope of the disclosure should be determined by the scope of the claims.

What is claimed is:

1. A communication method, comprising:
    generating a first radio frame by a communication apparatus, a time domain length of first symbol in the first radio frame exceeding any time domain length of any one of remaining symbols in the first radio frame; and
    transmitting the first radio frame by the communication apparatus;
    wherein the time domain length of the first symbol in the first radio frame is greater than or equal to an automatic gain control (AGC) settling time of the communication apparatus and AGC is performed according to a signal in the first symbol within the time domain length of the first symbol.

2. The communication method according to claim 1, wherein a sequence carried by the first symbol is a known sequence of the communication apparatus.

3. The communication method according to claim 1, further comprising:
    transmitting at least a second radio frame by the communication apparatus, all symbols in the second radio frame having a same time domain length.

4. The communication method according to claim 1, wherein the time domain length of the first symbol is 1/(15 kHz), and the time domain length of any one of the remaining symbols is 1/(15 kHz)/2k, wherein k is a positive integer.

5. The communication method according to claim 1, further comprising:
    generating a third radio frame by the communication apparatus, all symbols in the third radio frame having a same time domain length, sequences carried by first M symbols in the third radio frame being known sequences of the communication apparatus, wherein M is a positive integer; and
    transmitting the third radio frame by the communication apparatus.

6. The communication method according to claim 5, wherein a total time domain length of the first M symbols is 1/(15 kHz).

7. The communication method according to claim 5, wherein a time domain length of each symbol in the third radio frame is 1/(15 kHz)/2k.

8. The communication method according to claim 5, wherein the communication apparatus is a base station; and the communication method further comprises:
    transmitting, by the communication apparatus, indication information indicating that the communication apparatus is to transmit the third radio frame, before transmitting the third radio frame.

9. The communication method according to claim 5, wherein the communication apparatus is a terminal apparatus; and
the communication method further comprises:
receiving, by the communication apparatus, indication information, transmitted by a base station, indicating that the communication apparatus is required to transmit the third radio frame to the base station, before transmitting the third radio frame.

10. The communication method according to claim 1, wherein the communication apparatus is a base station; and
the communication method further comprises:
transmitting, by the communication apparatus, indication information indicating that the communication apparatus is to transmit the first radio frame, before transmitting the first radio frame.

11. The communication method according to claim 1, wherein the communication apparatus is a terminal apparatus; and
the communication method further comprises:
receiving, by the communication apparatus, indication information, transmitted by a base station, indicating that the communication apparatus is required to transmit the first radio frame to the base station, before transmitting the first radio frame.

12. The communication method according to claim 1, wherein when a plurality of radio frames are continuously transmitted, a time domain length of first symbol in first radio frame is greater than a time domain length of any one of remaining symbols in the first radio frame, all symbols in radio frames following the first radio frame have a same time domain length.

13. A communication method, characterized in comprising:
generating a first radio frame by a communication apparatus, all symbols in the first radio frame having a same time domain length, and sequences carried by first M symbols in the first radio frame being known sequences of the communication apparatus, wherein M is a positive integer; and
transmitting the first radio frame by the communication apparatus;
wherein a total time domain length of the first M symbols in the first radio frame is greater than or equal to an automatic gain control (AGC) settling time of the communication apparatus and AGC is performed according to signal in the first M symbols within the total time domain length of the first M symbols.

14. The communication method according to claim 13, wherein a total time domain length of the first M symbols is 1/(15 kHz).

15. The communication method according to claim 13, wherein a time domain length of each symbol in the first radio frame is 1/(15 kHz)/2k, wherein k is a positive integer.

16. A communication apparatus, comprising a memory, a processor, and a transceiver;
wherein the memory is configured to store codes, the processor is configured to execute the codes in the memory, and when the code is executed;
wherein the processor is configured to generate a first radio frame, a time domain length of first symbol in the first radio frame exceeding any time domain length of any one of remaining symbols in the first radio frame; and wherein the transceiver is configured to transmit the first radio frame;
wherein the time domain length of the first symbol in the first radio frame is greater than or equal to an automatic gain control (AGC) settling time of the communication apparatus and AGC is performed according to a signal in the first symbol within the time domain length of the first symbol.

17. The communication apparatus according to claim 16, wherein a sequence carried by the first symbol is a known sequence of the communication apparatus.

18. The communication apparatus according to claim 16, the transceiver is further configured to:
transmit at least a second radio frame by the communication apparatus, all symbols in the second radio frame having a same time domain length.

19. The communication apparatus according to claim 16, wherein the time domain length of the first symbol is 1/(15 kHz), and the time domain length of any one of the remaining symbols is 1/(15 kHz)/2k, wherein k is a positive integer.

20. The communication apparatus according to claim 16, the processor is further configured to: generate a third radio frame, all symbols in the third radio frame having a same time domain length, sequences carried by first M symbols in the third radio frame being known sequences of the communication apparatus, wherein M is a positive integer; and
the transceiver is further configured to transmit the third radio frame.

21. The communication apparatus according to claim 20, wherein a total time domain length of the first M symbols is 1/(15 kHz).

22. The communication apparatus according to claim 20, wherein a time domain length of each symbol in the third radio frame is 1/(15 kHz)/2k.

23. The communication apparatus according to claim 20, wherein the communication apparatus is a base station; and
the transceiver is further configured to:
transmit, before transmitting the third radio frame, indication information indicating that the communication apparatus is to transmit the third radio frame.

24. The communication apparatus according to claim 16, wherein the communication apparatus is a base station; and
the transceiver is further configured to:
transmit, before transmitting the first radio frame, indication information indicating that the communication apparatus is to transmit the first radio frame.

25. The communication apparatus according to claim 20, wherein the communication apparatus is a terminal apparatus; and
the transceiver is further configured to:
receive, before transmitting the third radio frame, indication information transmitted by a base station, indicating that the communication apparatus is required to transmit the third radio frame to the base station.

26. The communication apparatus according to claim 16, wherein the communication apparatus is a terminal apparatus; and
the transceiver is further configured to:
receive, before transmitting the first radio frame, indication information transmitted by a base station, indicating that the communication apparatus is required to transmit the first radio frame to the base station.

27. The communication apparatus according to claim 16, wherein when a plurality of radio frames are continuously transmitted, a time domain length of first symbol in first radio frame is greater than a time domain length of any one of remaining symbols in the first radio frame, all symbols in radio frames following the first radio frame have a same time domain length.

* * * * *